United States Patent
Bertolotti

[19]

[11] Patent Number: 5,996,613
[45] Date of Patent: Dec. 7, 1999

[54] SAFETY AND DEFAULT VALVE

[75] Inventor: Tommaso Bertolotti, Castronno, Italy

[73] Assignee: Cav. Uff. Giacomo Cimberio, S.p.A., S. Maurizio d'Opaglio, Italy

[21] Appl. No.: 09/139,896

[22] Filed: Aug. 25, 1998

[30] Foreign Application Priority Data

Dec. 15, 1997 [IT] Italy .................................. CO97A0020

[51] Int. Cl.$^6$ .................................................. F16K 35/00
[52] U.S. Cl. .................... 137/383; 137/384.2; 137/384.8
[58] Field of Search ............................... 137/383, 384.2, 137/384.4, 384.6, 384.8, 385

[56] References Cited

U.S. PATENT DOCUMENTS

| 2,092,572 | 9/1937 | Deane | 137/383 |
|---|---|---|---|
| 4,716,922 | 1/1988 | Camp | 137/384.8 |
| 5,094,265 | 3/1992 | Jackson et al. | 137/383 |
| 5,797,285 | 8/1998 | Sackowitz | 137/385 |

FOREIGN PATENT DOCUMENTS

| 2 717 552 | 9/1995 | France . |
|---|---|---|
| 36 39 306 | 6/1988 | Germany . |
| 1 148 817 | 4/1969 | United Kingdom . |
| 2 227 811 | 8/1990 | United Kingdom . |

*Primary Examiner*—David J. Walczak
*Attorney, Agent, or Firm*—Young & Thompson

[57] ABSTRACT

A safety and default valve in which a protective cup-shaped cap (11) incorporating a fixed lock (17) is housed freely rotatably on a control cap (16) with at least one engagement zone (17, 17A) for an ordinary operating wrench. A releasable engagement is provided between the bolt (19) of the lock (12) and a groove-like annular seat (18) in the control cap (16).

7 Claims, 3 Drawing Sheets

SAFETY AND DEFAULT VALVE

FIELD OF THE INVENTION

The present invention relates to a safety and default valve.

BACKGROUND OF THE INVENTION

As is known, safety valves and default valves are generally used in civil or residential and industrial water and gas user installations. Another case in which these valves are used is represented for example by public installations where water is made available to the public, such as in greens, parks and the like. The purpose of safety valves is principally to enable the shut-off member to be fixed and maintained securely in a predetermined position, namely open, closed or an intermediate position. The position in which the shut-off member is set must if possible be maintained even if the valve control means is tampered with or vandalized, as often happens with public installations. The incorporation of a lock in the handle of such safety valves, having a ball shut-off member, for example, is therefore known.

Default valves, on the other hand, are usually used at the inlet of the above-mentioned user installations and their purpose is to enable the water or gas supply company to cut off the supply of water or gas, that is to say, to lock the valve shut-off member in the closed position, if payment has not been made for previous supplies or in other particular situations. The locking of the shut-off member in the closed position is usually done by means of a sealing wire whose ends are crimped into a lead seal, or by means of a padlock, or by a lock incorporated in the valve control handle, in the same way as with safety valves. To enable the sealing wire or padlock to be fitted, known valves include two eyelets for the sealing wire or the staple of the padlock, that is one eyelet in the valve body and the other eyelet in the shut-off member control means. Known safety and default valves have many disadvantages.

A sharp jerk or blow on the handle of a safety valve may break the lock bolt, open the shut-off member and cause an unauthorized release of water or gas. While such acts of vandalism carried out on, say, safety valves fitted to sprinkler installations in public parks may result in damages and unauthorized releases of water or even flooding, in the case of valves on gas pipes, e.g. in unfinished buildings, or in the case of valves situated close to meters installed on the outside of buildings, such vandalism may cause explosions and considerable damages to people and structures.

The acts of vandalism, tampering, and the cutting of the leaded or sealing wires and padlock staples in default valves can lead to an unauthorized release of water, or gas, with a consequent detriment of the supply company, where a new sealing wire as well as a new padlock can then easily be fitted by the user himself, as has been discovered in many cases.

Another problem common to known safety and default valves is that the valve control handles housing the lock, or comprising the abovementioned eyelets for the sealing wires and padlocks, must be made in a variety of different shapes and sizes. This requires an increased expenditure on production and the holding of stocks of these components.

British patent application GB 2,227,811 A discloses a ball valve with a control cap fitted with geometrical engagement and with a fixing screw on the control spindle of the shut-off ball. The cap terminates at the top with a tapered end with a recessed hexagon to take a hexagonal control key. A protective outer cap of plastic is fitted with a snap action over the control cap in such a way as to be rotatable. The protective cap has an opening on its top to allow direct access to said recessed hexagon in the control cap so as to control or turn the shut-off member. The purpose of the protective cap is to prevent the control cap from being rotated by acting on it circumferentially with a gripping tool. Quite apart from the ease with which said plastic protective cap can be tampered with, it actually allows normal operation or turning of the valve with an ordinary hexagonal key.

French patent FR 2,717,552 A discloses a safety valve having a protective cylindrical metal cap which locks onto the control spindle of the shut-off member and onto the valve body in such a way that it cannot be rotated because of its geometrical engagement with corresponding projections on the valve body. A lock is housed removably on the opposite end of said cap from the valve and its bolt means engages with locking abutments provided in the cap. If the lock is opened and removed from the cap, the cap allows access to the control spindle of the shut-off member, which can be controlled with an appropriate socket wrench. On the other hand, if the lock is fitted to the protective cap, such access is prevented and the valve is made secure.

This patent FR 2,717,552 A represents the closest prior art and is considered in the preamble of claim 1.

However, this kind of valve has many drawbacks. Structurally, the protective cap is formed by an outer sleeve and an inner skirt and by numerous other components, making it expensive to produce, on the one hand, and laborious to assemble, on the other. The necessary geometrical engagement between the protective cap and the valve body requires the preparation of many different caps according to the dimensions of whichever valve is used.

Functionally, the protective cap fastened to the valve greatly restricts access to the shut-off member turning spindle. This is aggravated by the fact that, in order to house the lock, the protective sleeve must necessarily project a considerable amount from the free end of said turning spindle. This poor access to the ball turning spindle is also unfavorable because said turning spindle can only be operated with a special key which must necessarily be inserted into the protective cap. This creates even greater difficulties if the safety valve is installed in underground manholes, making access somewhat difficult. Another disadvantage is that the rigidity of the cap relative to the valve body makes it possible to exert a force action onto the protective cap, for example with a gripping or lever type of tool.

SUMMARY OF THE INVENTION

The object of the present invention is to provide a safety and default valve, fitted with a protective cap that avoids the disadvantages of the valves of the prior art and secures a high degree of security in combination with an extremely simple structure and a much reduced number of components.

The object indicated is solved, according to the invention, by a safety and default valve with the features of the independent claims.

A number of important advantages are achieved with the safety and default valves according to the invention. In the first place the proposed protective metal cap is formed in one piece. It is therefore simple to make and also requires few process steps for the housing and fixing of the locking/unlocking means in the form, for example, of a conventional and reliable cylinder lock. Since the protective cap can be spun idly when fitted, there is no possibility of actuating the spindle of the shut-off member from the outside or applying a rotational force to said protective cap. Removal of the protective cap, following opening of the incorporated lock, completely releases the control cap, thereby guaranteeing easy and convenient access to said control cap, irrespective of the position in which the valve has been installed. The machining of the proposed operating cap can be carried out on conventional automatic machine tools, which means that said control cap can be mass-produced, which will make it economical. Such a control cap can advantageously be made in the form of a modular cap, which is usable, together with the protective cap fitted over it, for valves of different dimensions. This is made possible by the fact that the proposed protective cap can rotate freely on the control cap and, therefore, relative to the valve body.

This is possible because the locating projection on the valve body engages with the control cap and not, as in the valve of FR 2,717,552 A, with the protective cap. This advantage is reflected in a simplification of the production of valves of different sizes and in the stock of components required for them. While on this subject, another important advantage is that any valve fitted with a control cap according to the invention can be converted, at any time, to a safety and default valve simply by fitting it with a protective cap according to the invention. This advantage is of the utmost importance for water and gas supply companies since it means that it is sufficient, say per 1,000 valves installed, to keep a stock of no more than 50 protective caps for when cases of arrears occur, where the proposed cap can be fitted simply by operating the incorporated lock with a conventional key, in other words without a tool. Once the arrears have been cleared, the cap can be removed and re-used for other arrears situations or cases. These advantages obviously also apply to safety valves, where the safety function is required for defined periods, e.g. on building sites while buildings are going up, and the like.

The adoption of a cylinder lock is inherently economical and secure, because, by using a lock with for example 5 movable parts, a very high number of combinations is possible.

The use of a control cap with two or more engagement zones or squares for operating wrenches increases the possibilities of operating the shut-off member and the control cap can advantageously be used for an entire range of valves.

The feature of housing the lock eccentrically in the closed end of the protective cap provides a reliable locking/unlocking engagement between the bolt of the lock and the seat in which said bolt is housed, within a very small space.

The safety and default valve of the present invention offers the advantage of a very simple and inexpensive construction. Other features of the safety and default valve of the present invention help to raise its level of security. The protective cap may be produced and sold as an independent component.

BRIEF DESCRIPTION OF THE DRAWINGS

Other features, advantages and details of the valves according to the invention will also appear in the following description which refers to the accompanying drawings showing two preferred embodiments of the invention, and in which.

DETAILED DESCRIPTION OF THE PREFERRED EMBODIMENTS

Figure 2:
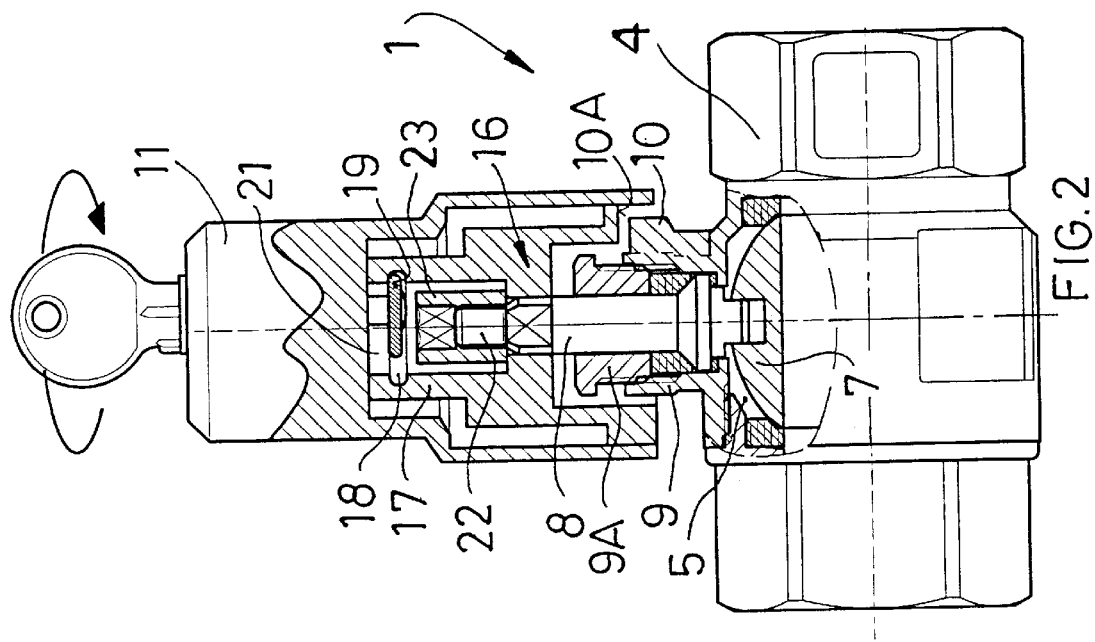
FIG. 2 shows the elevation of FIG. 1 with parts in section.
Figure 1:
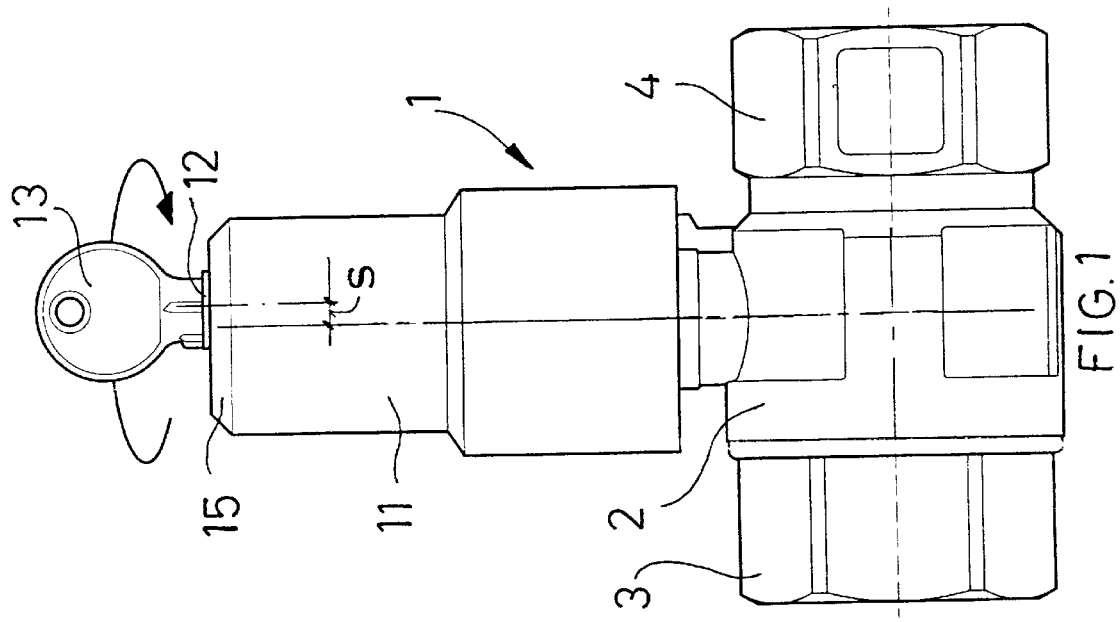
FIG. 1 shows a side view of a valve according to the invention in the assembled state.
Figure 3:
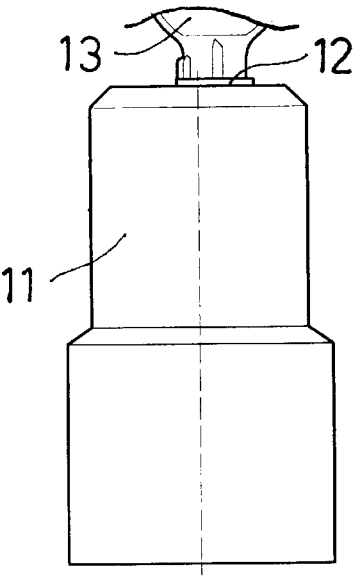
FIG. 3 shows the same valve as FIGS. 1 and 2 in an exploded view.
Figure 3:
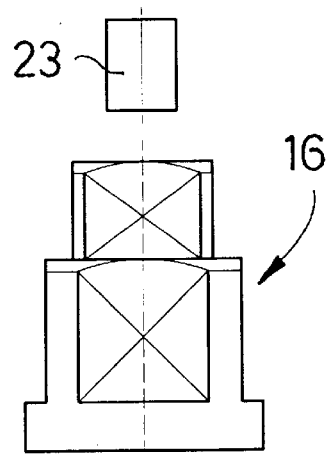
Figure 3:
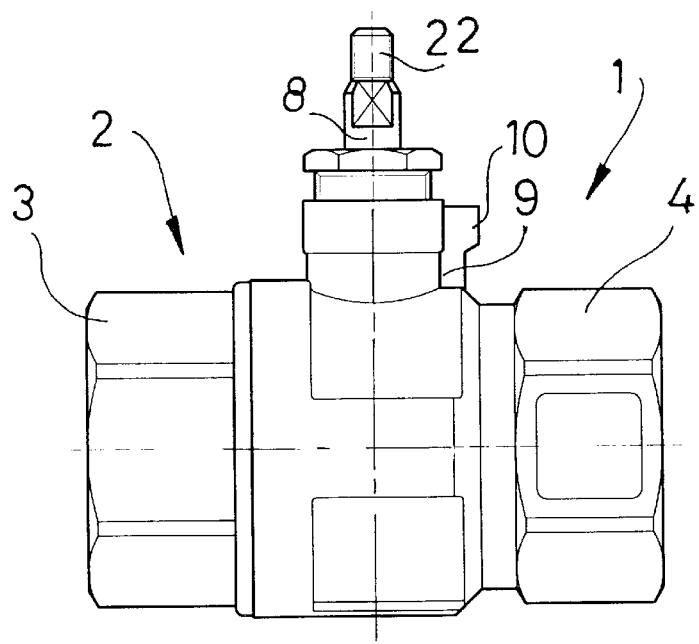

With reference to the drawings, the safety and default valve according to the invention is indicated as a whole by the numeral 1. It comprises, in accordance with the prior art, a valve body 2 with an inlet connection 3, an outlet connection 4 and a seat 5 for the leaktight housing of a shut-off member in the form, in the shown example, of a ball 7 whose turning spindle 8 projects leaktightly from a bush 9A housed in the collar 9 of the valve body 2. 11 denotes a protective cap that houses a lock 12 for controlling a locking/unlocking bolt means discussed in more detail below and controllable with a lock key 13. The turning or control spindle 8 by which the shut-off member is controllable is provided with a control means, also described in greater detail below.

The invention now departs from the prior art in that the protective cap 11 is made of metal and shaped like a cup and houses the lock 12 fixed in its closed end or bottom 15.

According to the invention, furthermore, the control means of the operating spindle 8 is constructed as a known removable control cap 16 that is capable of being fitted with geometrical engagement to the operating spindle 8, and includes an engagement zone or projection 17 for a conventional wrench, e.g. open-ended or socket wrenches or the like, in addition to an annular seat 18 for housing the bolt means 19 of the lock 12 freely rotatably in the locked position.

According to the invention, moreover, this annular seat 18 is formed inside a coaxial cavity 21 in the control cap 16, said cavity being intended to house the threaded free end 22 of the operating spindle 8 of the shut-off member 7. A nut 23 for locking the control cap 16 to the operating spindle 8 is screwed onto this threaded end 22 as in the prior art.

The height and depth of the annular groove 18 will obviously be chosen so that it can house the movable bolt part 19 of the lock 12 with some degree of clearance in the closed, i.e. locked, position. The lock can be fixed in the accommodating hole of the cap 11 by any suitable means, for example radial pins, not shown.

According to the invention the lock 12 is housed eccentrically in the cap 11, as shown by the letter s.

10A indicates an opening in the periphery of the operating cap 16, with vertical sides to engage with a tooth 10 on the valve body 2 for determining the open and closed positions of the ball 7. According to one feature of the invention, the control cap 16 includes not only the engagement zone or square 17 for a socket wrench, open-ended wrench or the like, but also at least one second zone or projection 17A of larger dimensions, where said control cap 16 can therefore be operated by a different size of wrench.

Aside from the protective cap 11 with its lock 12, the valve 1 may be of any conventional configuration. If now these valves have a control cap 16 with the annular seat or groove 18, the protective cap 11 can be applied at any moment to said control cap 16. Rotating the eccentric foot 19 in the groove 18 by turning the key 13 will lock the protective cap 11 onto the valve. When the key 13 is removed, the bolt 19 will remain positioned in the groove 18. The protective cap 11 can turn freely about the control cap 16 but cannot be displaced axially, that is removed. The cap 11 can only be removed by disengaging the bolt 19 from the annular groove 18 by re-inserting the key 13 and opening the lock. Once the lock has been opened it will be possible to remove the entire unit composed of the protective cap 11 and the incorporated lock 12 fixed inside it.

The metal cap 11 not only prevents any kind of direct intervention on the control cap 16 but also, owing to its ability to turn freely in both directions on the control cap 16, it is able to withstand a variety of attempts at tampering with it or vandalizing it.

At the same time it is obvious that, if used as a default valve, the protective cap 11 can be fitted at any moment without any preparatory work and without the help of any tool.

The configuration of the turning cap 16 according to the invention, with one or two engagement zones for wrenches, represents an efficient unified alternative to all the various handles and grips presently employed.

Figure 5:
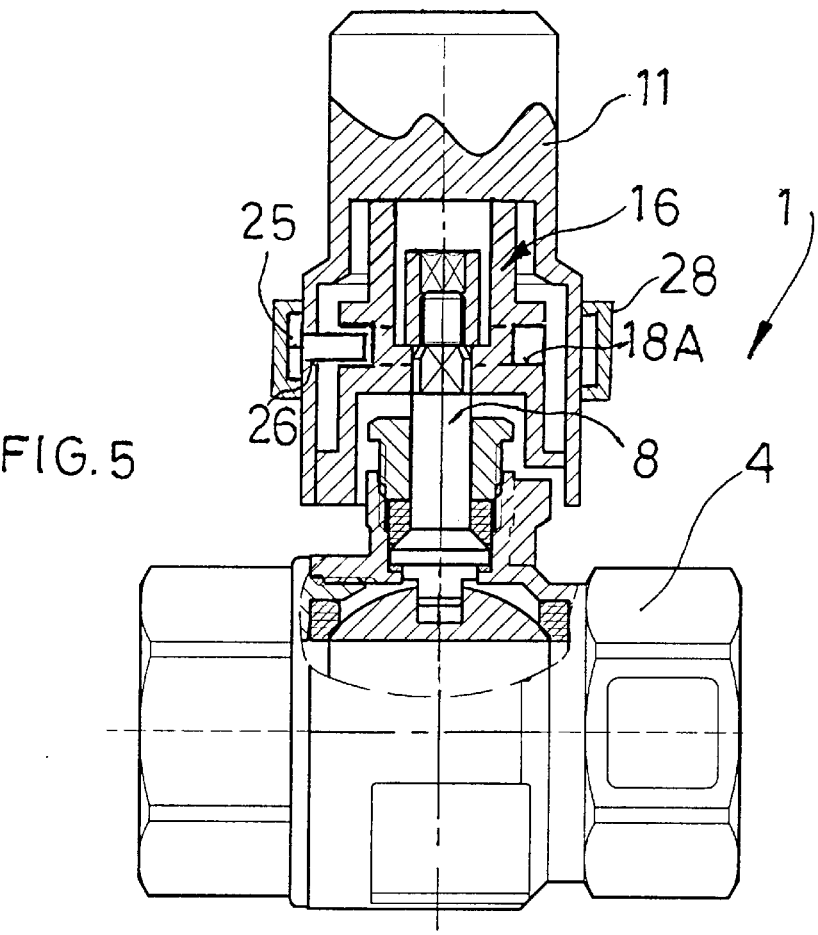
FIG. 5 shows a side view, partly in section as in FIG. 2, of a variant of the valve according to the invention.
Figure 4:
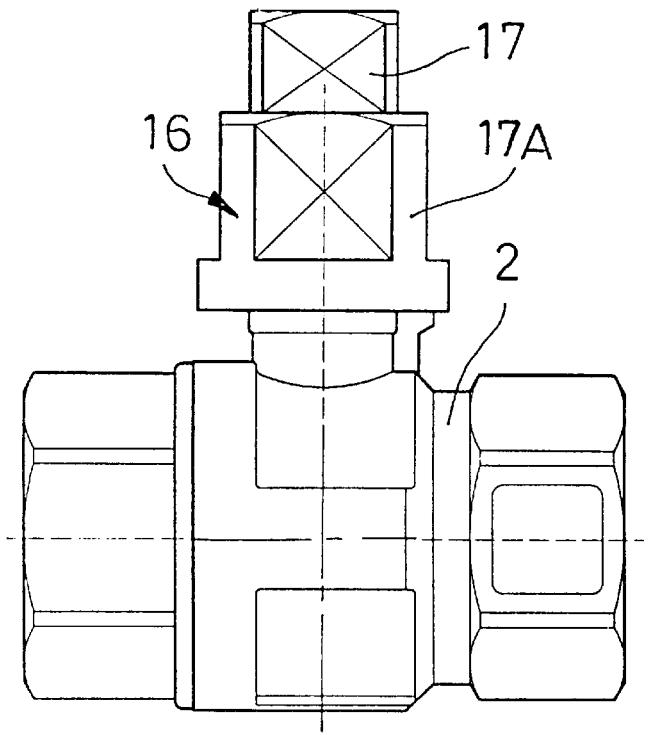
FIG. 4 shows a side view of the valve of FIGS. 1–3 with the protective cap removed.

The concept of the invention may also advantageously be implemented in other variants, as illustrated for example in FIG. 5.

In this variant the seat in the form of the annular groove 18A is sited on the outside rather than the inside of the control cap 16, where said groove 18A houses one or more pins, screws or other such means. FIG. 5 illustrates a screw 25 housed in a threaded hole 26 in the protective cap 11 in a plane coplanar with the plane of the groove 18A, once the cap 11 is fitted. The end of the screw, or the like, 25 enters the groove 18A to allow the cap 11 to rotate and prevents it from moving axially, i.e. being removed.

To prevent access to said security means 25, the invention allows for a security band 28 covering the heads of said locking/unlocking means 25, e.g. much like known pipe-gripping bands, with suitable closure means which are known and will not be further described. The operation is similar to that described in relation to the embodiment of FIGS. 1–4. Once again in the example of FIG. 5, the protective cap 11 can be fitted at any time without the need for preliminary adaptations. In view of the negligible costs of production of the grooves 18 and 18A, said grooves may be provided individually or both on modular, that is mass-produced, control caps 16.

Upon removal of the protective cap 11, the opening or closing of the shut-off member via the control cap 16 is effected in a known manner.

From the foregoing description it will be clear that the safety and default valves according to the invention satisfactorily fulfil the object indicated and achieve the advantages mentioned above.

The scope of the invention includes the use of other locking/unlocking means equivalent to those illustrated, and also the use of whatever shapes and materials may be desired for the production of the protective caps, as well as the option of fitting said caps with removable rubber or plastic covers, without departing from the scope of the present invention.

I claim:

1. In a safety and default valve comprising:
    a valve body with an inlet connection, an outlet connection and a seat for a leaktight housing of a shut-off member having an operating spindle which projects leaktightly from the valve body;
    a protective cap housing a control lock with a locking/unlocking bolt means; and
    a control means, fixable to said operating spindle, for controlling the operating spindle of the shut-off member;
    the improvement wherein:
        the protective cap is cup-shaped and has a closed end; said protective cap housing the lock fixed in said closed end;
        the control means of the operating spindle comprising a removable control cap structured and arranged to fit with geometrical engagement on the operating spindle of the shut-off member;
        said control cap including at least one engagement zone for receiving a wrench and an annular seat for housing the bolt means of the lock in a locked position in which said protective cap is freely rotatable with respect to the valve body; and
        said annular seat being formed inside a coaxial cavity in the control cap, said operating spindle having a threaded free end which projects into said cavity, and said threaded free end adapted to receive a fixing nut.

2. The safety and default valve according to claim 1, wherein the control cap has at least two engagement zones for receiving wrenches of different sizes.

3. The safety and default valve according to claim 1, wherein the lock is housed eccentrically in the closed end of the protective cap.

4. A safety and default valve comprising:
    a valve body with an inlet connection, an outlet connection and a seat for a leaktight housing of a shut-off member having a spindle which projects leaktightly from the valve body;
    a protective cap housing means for locking/unlocking said protective cap relative to the valve;
    a control means for operating the spindle of the shut-off member;
    said protective cap being cup-shaped and having a circumferential skirt; said protective cap housing said locking/unlocking means removably in said circumferential skirt;
    said control means of the spindle of the shut-off member comprising a removable control cap adapted to be fitted with geometrical engagement on the spindle of the shut-off member; said control cap including at least one engagement zone for receiving a wrench, and further including an annular seat for housing said locking/unlocking means in a locked position in which the protective cap is freely rotatable about the control cap, but not axially movable;
    said annular seat being formed on the outside of said control cap; and
    said locking/unlocking means comprising at least one pin having a free end housed in a hole in the skirt of the protective cap, said free end structured and arranged to enter said annular seat.

5. The safety and default valve according to claim 4, comprising a plurality of locking/unlocking means regularly distributed around the circumference of the protective cap.

6. The safety and default valve according to claim 5, further comprising a peripheral band to cover and conceal said locking/unlocking means.

7. The safety and default valve according to claim 4, further comprising a peripheral band to cover and conceal said locking/unlocking means.

* * * * *